(12) United States Patent
Penev

(10) Patent No.: US 9,067,500 B2
(45) Date of Patent: Jun. 30, 2015

(54) SELF RECHARGEABLE SYNERGY DRIVE FOR A MOTOR VEHICLE

(71) Applicant: Krassimire Mihaylov Penev, Stamford, CT (US)

(72) Inventor: Krassimire Mihaylov Penev, Stamford, CT (US)

(*) Notice: Subject to any disclaimer, the term of this patent is extended or adjusted under 35 U.S.C. 154(b) by 70 days.

(21) Appl. No.: 14/086,926

(22) Filed: Nov. 21, 2013

(65) Prior Publication Data

US 2014/0076641 A1 Mar. 20, 2014

Related U.S. Application Data

(63) Continuation-in-part of application No. 13/476,192, filed on May 21, 2012, now Pat. No. 8,646,550.

(51) Int. Cl.
| | | |
|---|---|---|
| *B60L 7/28* | (2006.01) | |
| *B60L 8/00* | (2006.01) | |
| *B60L 7/10* | (2006.01) | |
| *B60K 16/00* | (2006.01) | |
| *B60K 11/02* | (2006.01) | |
| *B60K 1/00* | (2006.01) | |

(52) U.S. Cl.
CPC . *B60L 7/28* (2013.01); *B60L 8/003* (2013.01); *B60L 8/006* (2013.01); *Y02T 10/7083* (2013.01); *B60L 7/10* (2013.01); *B60L 2220/46* (2013.01); *B60K 11/02* (2013.01); *B60K 16/00* (2013.01); *B60K 2001/006* (2013.01); *B60K 2016/006* (2013.01); *B60L 2200/26* (2013.01); *Y02T 10/90* (2013.01)

(58) Field of Classification Search
CPC ............. B60L 7/28; B60L 7/10; B60K 16/00; Y02T 10/7083; Y02T 10/90
See application file for complete search history.

(56) References Cited

U.S. PATENT DOCUMENTS

| | | | | |
|---|---|---|---|---|
| 836,875 | A | * 11/1906 | Gilbert | ........................... 180/2.2 |
| 1,671,033 | A | 5/1928 | Kimura | |
| 2,762,469 | A | * 9/1956 | Lyon | ........................ 188/264 W |
| 3,168,348 | A | 2/1965 | Fleming et al. | |
| 3,301,357 | A | * 1/1967 | Cussons et al. | ........... 188/264 R |
| 3,556,239 | A | 1/1971 | Spahn | |
| 3,688,859 | A | 9/1972 | Huspeth | |
| 4,168,759 | A | 9/1979 | Hull et al. | |
| 4,182,960 | A | 1/1980 | Reuyl | |
| 4,254,843 | A | 3/1981 | Han et al. | |
| 4,864,173 | A | * 9/1989 | Even | ............................... 310/93 |
| 5,303,802 | A | * 4/1994 | Kuwahara | ..................... 188/158 |
| 5,725,062 | A | 3/1998 | Fronek | |

(Continued)

FOREIGN PATENT DOCUMENTS

| | | |
|---|---|---|
| EP | 0331559 A | 9/1989 |
| EP | 1747910 A2 | 1/2007 |

(Continued)

*Primary Examiner* — J. Allen Shriver, II
*Assistant Examiner* — Stevn Clemmons
(74) *Attorney, Agent, or Firm* — Hess Patent Law Firm LLC; Robert J. Hess

(57) ABSTRACT

Wheels may be equipped with a stator and rotor to induce current to generate electricity as the wheels rotate or to slow down the wheels in response to the application of a brake of the vehicle. Air may be sucked through the wheels through mesh screens to create air flow that passes through ductwork to reach a turbine generator, which generates electricity in response to blade rotation from air flow. A roof mounted solar energy conversion system may generate electricity. A vehicle power supply boosts its energy from all the electricity generated.

16 Claims, 10 Drawing Sheets

(56) References Cited

U.S. PATENT DOCUMENTS

| | | | |
|---|---|---|---|
| 6,138,781 A | 10/2000 | Hakala | |
| 6,698,554 B2 * | 3/2004 | Desta et al. | 188/158 |
| 6,857,492 B1 | 2/2005 | Liskey et al. | |
| 6,871,919 B2 * | 3/2005 | Anwar et al. | 303/152 |
| 7,226,018 B2 | 6/2007 | Sullivan | |
| 7,347,294 B2 * | 3/2008 | Gonzalez | 180/65.1 |
| 7,398,841 B2 | 7/2008 | Kaufman | |
| 7,665,553 B2 | 2/2010 | Tabe | |
| 7,665,554 B1 | 2/2010 | Walsh | |
| 7,854,278 B2 | 12/2010 | Kaufman | |
| 8,240,196 B2 | 8/2012 | Park | |
| 8,364,362 B2 | 1/2013 | Karlsson | |
| 8,434,574 B1 * | 5/2013 | York et al. | 180/2.2 |
| 2003/0116391 A1 | 6/2003 | Desta et al. | |
| 2003/0189380 A1 | 10/2003 | Ishikawa et al. | |
| 2004/0108769 A1 | 6/2004 | Marathe | |
| 2004/0262105 A1 * | 12/2004 | Li et al. | 188/267 |
| 2004/0263099 A1 * | 12/2004 | Maslov et al. | 318/254 |
| 2005/0162012 A1 | 7/2005 | Sakai et al. | |
| 2006/0016628 A1 * | 1/2006 | Heinen | 180/65.1 |
| 2006/0087182 A1 * | 4/2006 | Sugiyama | 310/75 C |
| 2007/0295568 A1 | 12/2007 | Vasilescu | |
| 2008/0035440 A1 | 2/2008 | Hoeller | |
| 2008/0041643 A1 | 2/2008 | Khalife | |
| 2008/0179114 A1 | 7/2008 | Chen | |
| 2008/0257614 A1 * | 10/2008 | Tabe | 180/2.2 |
| 2008/0263731 A1 * | 10/2008 | Tabe | 903/903 |
| 2009/0219050 A1 | 9/2009 | Dessirier et al. | |
| 2009/0301829 A1 * | 12/2009 | Newiadomy et al. | 188/267 |
| 2010/0006351 A1 | 1/2010 | Howard | |
| 2010/0006699 A1 * | 1/2010 | Sullivan | 244/111 |
| 2010/0155161 A1 * | 6/2010 | Corradini | 180/65.22 |
| 2010/0181126 A1 * | 7/2010 | Penrod | 180/65.285 |
| 2010/0225282 A1 | 9/2010 | Paasch | |
| 2011/0202248 A1 * | 8/2011 | Klausner et al. | 701/70 |
| 2011/0226569 A1 | 9/2011 | Devlieg | |
| 2011/0266075 A1 | 11/2011 | Guzelimian | |
| 2012/0085587 A1 | 4/2012 | Drouin | |
| 2012/0211286 A1 * | 8/2012 | Samuel | 180/2.2 |
| 2012/0265381 A1 * | 10/2012 | Lee | 701/22 |
| 2013/0015026 A1 | 1/2013 | Li et al. | |

FOREIGN PATENT DOCUMENTS

| | | |
|---|---|---|
| FR | 2577357 A | 8/1986 |
| WO | 2011004921 A1 | 1/2011 |

* cited by examiner

SELF RECHARGEABLE SYNERGY DRIVE FOR A MOTOR VEHICLE

CROSS-REFERENCE TO COPENDING PATENT APPLICATIONS

This is a continuation-in-part of patent application Ser. No. 13/476,192 filed May 21, 2012.

BACKGROUND OF THE INVENTION

1. Field of the Invention

The present invention relates to boosting an amount of electrical energy available for a motor vehicle from recovered energy sources, including motor vehicle kinetic energy, wind flow, and solar radiation, and providing frictionless braking powered from the recovered energy sources.

2. Discussion of Related Art

The contents of the BACKGROUND OF THE INVENTION for U.S. Ser. No. 13/476,192 is incorporated herein by reference, which includes discussions under subheadings entitled: a. vehicle energy source recoveries, b. electric retarders, c. regenerative braking, d. wheel/hub motors, and e. converting kinetic rotary wheel motion into electricity generation.

US patent publication no. 2012/0265381 to Lee discloses an electric vehicle having a motor generator, which can control the operation ratio of a motor and a generator, and a driving method therefor. The electric vehicle has a plurality of rotating means; a motor generator including a rotor having a plurality of magnets and a stator having a plurality of induction coils and a plurality of generating coils; a charging unit for charging electric energy produced by the motor generator; a battery unit for storing the electric energy received from the charging unit; an accelerator for controlling the acceleration state of the electric vehicle under control of a driver of the electric vehicle; and control unit for operating at least some of the plurality of induction coils in the motor generator as generating coils, depending on the acceleration state and/or the speed of the electric vehicle, or for operating at least some of the plurality of generating coils in the motor generator as induction coils, depending on the acceleration state and/or the speed of the electric vehicle.

U.S. Pat. No. 7,226,018 to Sullivan discloses aircraft landing gear with a wheel hub motor/generator disks stack that includes alternating rotor and stator disks mounted with respect to the wheel support and wheel. Motive force is applied to the wheel when electrical power is applied, e.g. prior to touch-down, thus decreasing the difference in relative velocities of the tire radial velocity with that of the relative velocity of the runway and reducing the sliding friction wear of the tire. After touchdown the wheel hub motor/generator may be used as a generator thus applying a regenerative braking force and/or a motorized braking action to the wheel. The energy generated upon landing may be dissipated through a resistor and/or stored for later use in providing a source for motive power to the aircraft wheels for taxiing and ground maneuvers of the aircraft. Further, eddy current braking may be used as opposed to electromagnetic braking for which the braking is accomplished by applying electrical current to the stator disk such that the magnetic field of the stator disk induces eddy currents within said rotor disk. Thus there is developed a magnetic torque which generates a braking action upon the wheel of the aircraft. Any combination of the above embodiments may be used in addition to that of friction braking systems currently used, thus increasing the life and aiding the usefulness of the friction braking system as well as reducing the associated maintenance cost by reducing the rate of wear and the number of friction disk required.

European patent EP 1747910 A3 provides for wheel spokes serving as turbine blades that, with the natural movement of the vehicle, will cause an airflow that can suck away heat produced by disc brakes and the engine or introduce an axial airflow from the exterior that cools the disc brakes or engine.

Regenerative Braking

According to the webpage http://alternativefuels.about.com/od/hybridvehicles/a/regenbraking.htm of About.com under the heading Hybrid Cars & Alt Fuels, there is an article by Christine and Scott Gable entitled "How Does Regenerative Braking Work". The following are excerpts:

Any permanent magnet motor can operate as either a motor or generator. In all-electrics and hybrids, they are more precisely called a motor/generator (M/G).

An AC Motor/Generator Consists of 4 Main Parts:

A shaft-mounted wire wound armature (rotor)

A field of magnets that induce electrical energy stacked side-by-side in a housing (stator)

Slip rings that carry the AC current to/from the armature

Brushes that contact the slip rings and transfer current to/from the electrical circuit The AC Generator in Action The armature is driven by a mechanical source of power (for example, in commercial electric power production it would be a steam turbine). As this wound rotor spins, its wire coil passes over the permanent magnets in the stator and an electric current is created in the wires of the armature. But because each individual loop in the coil passes first the north pole then the south pole of each magnet sequentially as it rotates on its axis, the induced current continually, and rapidly, changes direction. Each change of direction is called a cycle, and it is measured in cycles-per-second or hertz (Hz). In the United States, the cycle rate is 60 Hz (60 times per second), while in most other developed parts of the world it is 50 Hz. Individual slip rings are fitted to each of the two ends of the rotor's wire loop to provide a path for the current to leave the armature. Brushes (which are actually carbon contacts) ride against the slip rings and complete the path for the current into the circuit to which the generator is attached.

The AC Motor in Action

Motor action (supplying mechanical power) is in essence the reverse of generator action. Instead of spinning the armature to make electricity, current is fed by a circuit, through the brushes and slip rings and into the armature. This current flowing through the coil wound rotor (armature) turns it into an electromagnet. The permanent magnets in the stator repel this electromagnetic force causing the armature to spin. As long as electricity flows through the circuit, the motor will run.

Most, if not all, hybrids and electrics use an electronic throttle control system. When the throttle pedal is pushed, a signal is sent to the onboard computer, which further activates a relay in the controller that will send battery current through an inverter/converter to the M/G causing the vehicle to move. The harder the pedal is pushed, the more current flows under direction of a variable resistance controller and the faster the vehicle goes. In a hybrid, depending upon load, battery state-of-charge and the design of the hybrid drivetrain, a heavy throttle will also activate the internal combustion engine (ICE) for more power. Conversely, lifting slightly on the throttle will decrease current flow to the motor and the vehicle will slow down. Lifting further or completely off the throttle will cause the current to switch direction— moving the M/G from motor mode to generator mode— and begin the regenerative braking process.

Regenerative Braking: Slowing the Vehicle and Generating Electricity

This is really what the regen mode is all about. With the electronic throttle closed and the vehicle still moving, all of its kinetic energy can be captured to both slow the vehicle and recharge its battery. As the onboard computer signals the battery to stop sending electricity (via the controller relay) and start receiving it (through a charge controller), the M/G simultaneously stops receiving electricity for powering the vehicle and starts sending current back to the battery for charging.

. . . when an M/G is supplied with electricity it makes mechanical power, when it's supplied with mechanical power, it makes electricity. But how does generating electricity slow the vehicle? Friction. It's the enemy of motion. The armature of the M/G is slowed by the force of inducing current in the windings as it passes over the opposing poles in the magnets in the stator (it's constantly battling the push/pull of the opposing polarities). It is this magnetic friction that slowly saps the vehicle's kinetic energy and helps scrub off speed.

According to the online encyclopedia Wikipedia:

The most common form of regenerative brake involves using an electric motor as an electric generator. In electric railways the generated electricity is fed back into the supply system, whereas in battery electric and hybrid electric vehicles, the energy is stored chemically in a battery, electrically in a bank of capacitors, or mechanically in a rotating flywheel. Hydraulic hybrid vehicles use hydraulic motors and store energy in form of compressed air.

Limitations

Traditional friction-based braking is used in conjunction with mechanical regenerative braking for the following reasons:

The regenerative braking effect drops off at lower speeds; therefore the friction brake is still required in order to bring the vehicle to a complete halt. Physical locking of the rotor is also required to prevent vehicles from rolling down hills.

The friction brake is a necessary back-up in the event of failure of the regenerative brake.

Most road vehicles with regenerative braking only have power on some wheels (as in a two-wheel drive car) and regenerative braking power only applies to such wheels because they are the only wheels linked to the drive motor, so in order to provide controlled braking under difficult conditions (such as in wet roads) friction based braking is necessary on the other wheels.

The amount of electrical energy capable of dissipation is limited by either the capacity of the supply system to absorb this energy or on the state of charge of the battery or capacitors. Regenerative braking can only occur if no other electrical component on the same supply system is drawing power and only if the battery or capacitors are not fully charged. For this reason, it is normal to also incorporate dynamic braking to absorb the excess energy.

Under emergency braking it is desirable that the braking force exerted be the maximum allowed by the friction between the wheels and the surface without slipping, over the entire speed range from the vehicle's maximum speed down to zero. The maximum force available for acceleration is typically much less than this except in the case of extreme high-performance vehicles. Therefore, the power required to be dissipated by the braking system under emergency braking conditions may be many times the maximum power which is delivered under acceleration. Traction motors sized to handle the drive power may not be able to cope with the extra load and the battery may not be able to accept charge at a sufficiently high rate. Friction braking is required to dissipate the surplus energy in order to allow an acceptable emergency braking performance. For these reasons there is typically the need to control the regenerative braking and match the friction and regenerative braking to produce the desired total braking output.

Eddy Current Braking

According to the online encyclopedia Wikipedia:

Eddy Current Brake

An eddy current brake, like a conventional friction brake, is responsible for slowing an object, such as a train or a roller coaster. However, unlike electro-mechanical brakes, which apply mechanical pressure on two separate objects, eddy current brakes slow an object by creating eddy currents through electromagnetic induction which create resistance, and in turn either heat or electricity.

Circular Eddy Current Brake

Electromagnetic brakes are similar to electrical motors; non-ferromagnetic metal discs (rotors) are connected to a rotating coil, and a magnetic field between the rotor and the coil creates a resistance used to generate electricity or heat. When electromagnets are used, control of the braking action is made possible by varying the strength of the magnetic field. A braking force is possible when electric current is passed through the electromagnets. The movement of the metal through the magnetic field of the electromagnets creates eddy currents in the discs. These eddy currents generate an opposing magnetic field (Lenz's law), which then resists the rotation of the discs, providing braking force. The net result is to convert the motion of the rotors to heat in the rotors.

Japanese Shinkansen trains had employed circular eddy current brake system on trailer cars since 100 Series Shinkansen. However, N700 Series Shinkansen abandoned eddy current brakes in favour of regenerative brakes since 14 of the 16 cars in the trainset used electric motors.

Linear Eddy Current Brake

The principle of the linear eddy current brake has been described by the French physicist Foucault, hence in French the eddy current brake is called the "frein à courants de Foucault".

The linear eddy current brake consists of a magnetic yoke with electrical coils positioned along the rail, which are being magnetized alternating as south and north magnetic poles. This magnet does not touch the rail, as with the magnetic brake, but is held at a constant small distance from the rail (approximately 7 mm).

When the magnet is moved along the rail, it generates a non-stationary magnetic field in the head of the rail, which then generates electrical tension (Faraday's induction law), and causes eddy currents. These disturb the magnetic field in such a way that the magnetic force is diverted to the opposite of the direction of the movement, thus creating a horizontal force component, which works against the movement of the magnet. The braking energy of the vehicle is converted in eddy current losses which lead to a warming of the rail. (The regular magnetic brake, in wide use in railways, exerts its braking force by friction with the rail, which also creates heat.)

The eddy current brake does not have any mechanical contact with the rail, and thus no wear, and creates no noise or odor. The eddy current brake is unusable at low speeds, but can be used at high speeds both for emergency braking and for regular braking.[1]

The TSI (Technical Specifications for Interoperability) of the EU for trans-European high speed rail recommends that all newly built high speed lines should make the eddy current brake possible.

The first train in commercial circulation to use such a braking system has been the ICE 3.

Modern roller coasters also use this type of braking, but in order to avoid the risk of potential power outages, they utilize permanent magnets instead of electromagnets, thus not requiring any power supply, however, without the possibility to adjust the braking strength as easily as with electromagnets.

A Telma retarder is frictionless electromagnetic braking system made by Telma, a company that is part of the Valeo group, a French automotive components manufacturer. A Telma retarder is an eddy current brake system.

The system works by energizing coils with alternating polarities in order to create an electromagnetic field. Eddy currents are generated in two rotors as they pass through this field, applying a braking torque to their rotation and therefore to the driveshafts attached to them. The stator houses the electromagnetic coils and is attached to the chassis, the transmission or an axle of the vehicle. Round discs called rotors are attached to the driveline. A thin air gap is maintained between the rotors and the coils. In normal operation, the rotor turns freely but when electric current flows through the coils, eddy currents are created that apply braking torque to the rotors and therefore to the driveline.

A frictionless braking system acts as a completely independent back-up braking system, and remains operative whatever the temperature. And because the mechanism is frictionless, brake fade is practically eliminated while the mechanism virtually never wears out. Stop-and-go driving can quietly destroy a vehicle's friction brakes, causing it to overshoot a busy intersection. By performing most of the vehicle deceleration before the foundation brakes are even applied, the frictionless braking system increases the safe stopping ability of the vehicle, and extends the life of the traditional brakes.

According to an online webpage at http://electricalsimplified.blogspot.com/2011/09/eddy-current-brakes.html that is entitled "Electrical Simplified . . . !!!":

An eddy current brake, unlike electro-mechanical brakes, which apply mechanical pressure on two separate objects, slow an object by creating eddy currents through electromagnetic induction which create resistance, and in turn either heat or electricity. Magnetic brakes are silent and are much smoother than friction brakes, gradually increasing the braking power so that the people on the ride do not experience rapid changes in acceleration. Eddy current brakes are made from a large electrically conducting object moving through a stationary magnetic field. The magnet can be either a permanent magnet or an electromagnet. The movement can be either in a straight line or circular. When a metallic wheel passes between the rows of magnets, eddy currents are generated. Because of the tendency of eddy currents to oppose, eddy currents cause energy to be lost. More accurately, eddy currents transform more useful forms of energy, such as kinetic energy, into heat, which is generally much less useful. During braking, the metal wheels are exposed to a magnetic field from an electromagnet, generating eddy currents in the wheels. The magnetic interaction between the applied field and the eddy currents acts to slow the wheels down. The faster the wheels are spinning, the stronger the effect since large speed produces large change in flux and hence large amount of eddy current which is proportional to force, meaning that as the train slows the braking force is reduced, producing a smooth stopping motion. This very property, however, is also one of magnetic breaking's disadvantages in that the eddy force itself can never completely stop a train in ideal condition.

According to an online article at http://www.thyssenkrupp-magnettechnik.com/en/eddy-current-couplings-and-brakes.php that is entitled "Eddy current couplings and brakes" by the company ThyssenKrupp Magnettechnik:

In eddy current clutches and brakes the temperature coefficient of the copper is considered along with the temperature coefficient of the magnet. Eddy current clutches and brakes heat up considerably due to the development of eddy currents with increasing rpm.; with temperature increase the value of the torque attainable decreases considerably. If cooling is not provided, temperatures up to 200° C. at relative rpm of 1000/min can occur on the copper disc whereby the torque decreases by 50%. The losses thereby incurred are partly irreversible. They can only be recovered by remagnetisation. If the temperature is kept below 50° C., the decrease in torque is only about 10%.

Thus, eddy current brakes can be expected to heat up considerably from the eddy currents that arise. It is desired to prevent such heat build-up for eddy current brakes and to generate electricity while the eddy current brakes are idle, i.e., not effecting braking, by utilizing all inductive and conductive elements that might otherwise be utilized by the eddy current brakes when braking.

SUMMARY OF THE INVENTION

One aspect of the invention resides in at least one motor driven vehicle wheel being equipped with a rotor and a stator that cooperate with each other to generate electricity in response to rotation of the motor vehicle wheel and that generate eddy currents to slow or stop rotation of vehicle wheel in response to braking. The at least one motor vehicle wheel may also be equipped with means for sucking in wind to create airflow that takes in heated air due to the eddy currents. The airflow may be dissipated from the vehicle or channeled to drive a turbine generator to generate electricity.

For instance, another aspect resides in sucking in wind through the wheels to create the airflow that removes heat from the eddy currents. A further aspect resides in channeling the airflow to a wind turbine that generates electricity. The electricity generated by the wind turbine in response to the motor driven vehicle being driven is likewise stored in the same storage battery or set of storage batteries.

Preferably, some of the motor vehicle wheels are also equipped with conventional friction brakes and/or conventional regenerative braking that recoup some of the energy lost during stopping by saving the energy in a storage battery or set of storage batteries to be used later to power the motor whenever the car is in electric mode.

BRIEF DESCRIPTION OF THE DRAWING

For a better understanding of the present invention, reference is made to the following description and accompanying drawings, while the scope of the invention is set forth in the appended claims.

DESCRIPTION OF THE PREFERRED EMBODIMENT

Figure 1:
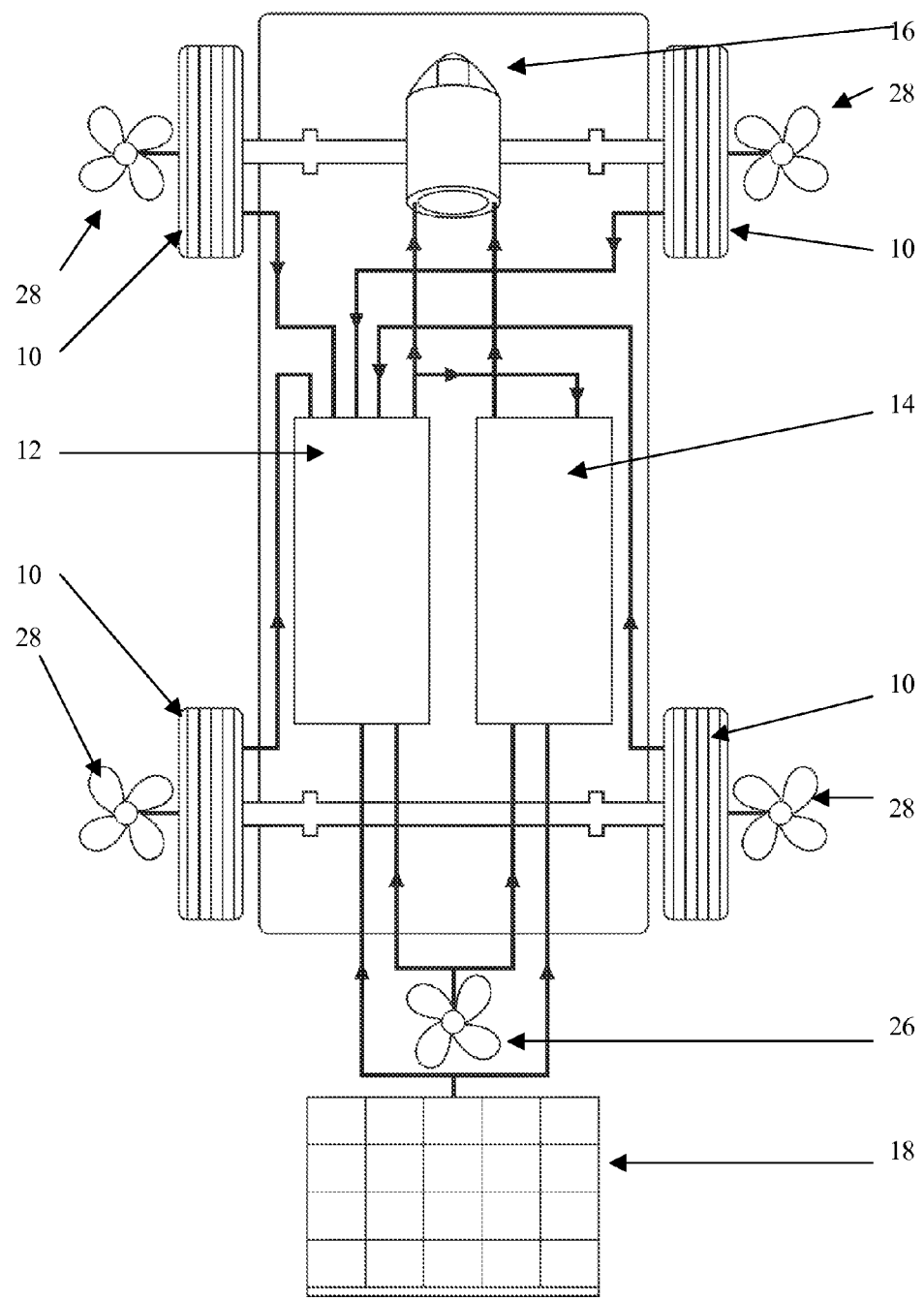
FIG. 1 is a schematic diagram of a motor vehicle drive system equipped with electricity generators, wind turbine generators, solar panels, batteries, and motors in accordance with a single motor drive embodiment of the invention.
Figure 2:
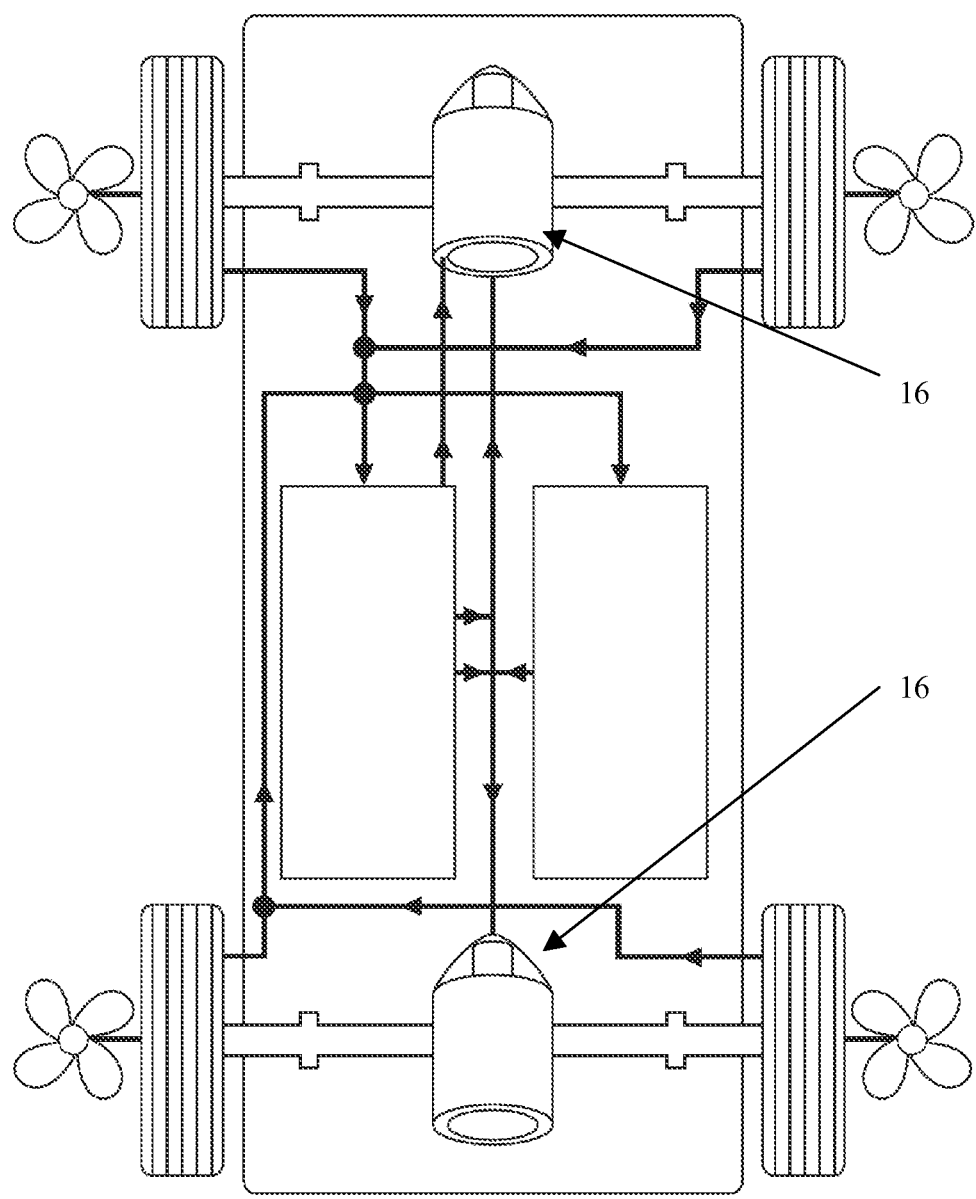
FIG. 2 is a schematic diagram of a motor vehicle drive system equipped with electricity generators, batteries, and motors in accordance with a dual motor drive embodiment of the invention.
Figure 3:
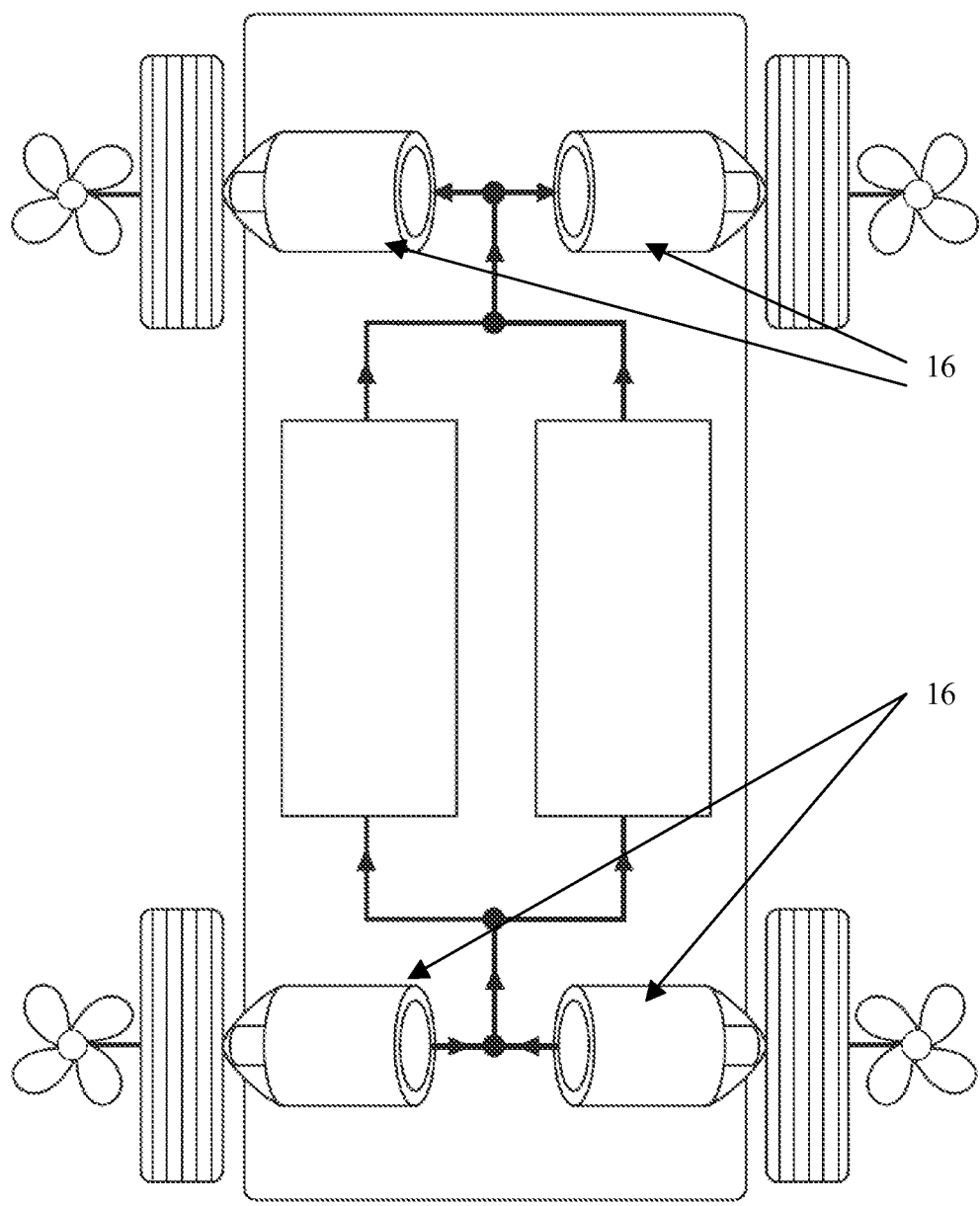
FIG. 3 is a schematic diagram of a four-motor (one for each wheel) motor vehicle drive system equipped with electricity generators, batteries, and motors in accordance with a four motor drive embodiment of the invention.

Turning to the drawing, FIGS. 1-3 show schematically respective drive systems of motor vehicle. FIG. 1 shows a single motor drive system. FIG. 2 shows a dual motor drive system. FIG. 3 shows a four motor drive system with each motor in a respective wheel.

FIGS. 1-3 have the following components in common: four wheels 10, two storage batteries 12, 14 and at least one motor 16 powered by the batteries 12, 14. While FIGS. 1-3 shows a wind suction fan 28 at each wheel that directs airflow to a turbine generator 26 and FIG. 1 shows a roof mounted solar panel electricity generator 18. The roof mounted solar panel electricity generator 18 and the turbine generator 26 may be provided in the same manner for the embodiments of FIGS. 2 and 3.

As shown in FIGS. 1-4, each wheel is equipped with induction means 20 for creating a magnetic field in proximity of conductive elements. The relative arrangement may be either that the magnetic field turns within conductive elements or the conductive elements turn within the magnetic field. However, the rotary wheel hub has conductive rotor elements 22 that spin about a stator 24. The stator 24 may be equipped with permanent magnets and/or electromagnets.

The batteries 12, 14 receive an synergy energy boost when charged by electricity generation from a generator using the induction means 20 to convert kinetic motion of the vehicle wheel into electricity as the vehicle wheel 10 rotates and from a wind turbine generator. The batteries 12, 14 also receive the synergy energy boost when charged by the electricity from the wind turbine generator 26 (FIG. 4) or the solar panel electricity generator 18 (FIGS. 1 and 4).

The induction means 20 is operative in two modes of operation. The first is to recover kinetic energy from tire rotation as the motor vehicle moves and convert the recovered energy into electricity. The second is to slow the vehicle by service as electromagnetic retarders. The first mode of operation arises when no brake is actuated and the second mode of operation arises when the brake is actuated to slow the vehicle.

Figure 4:
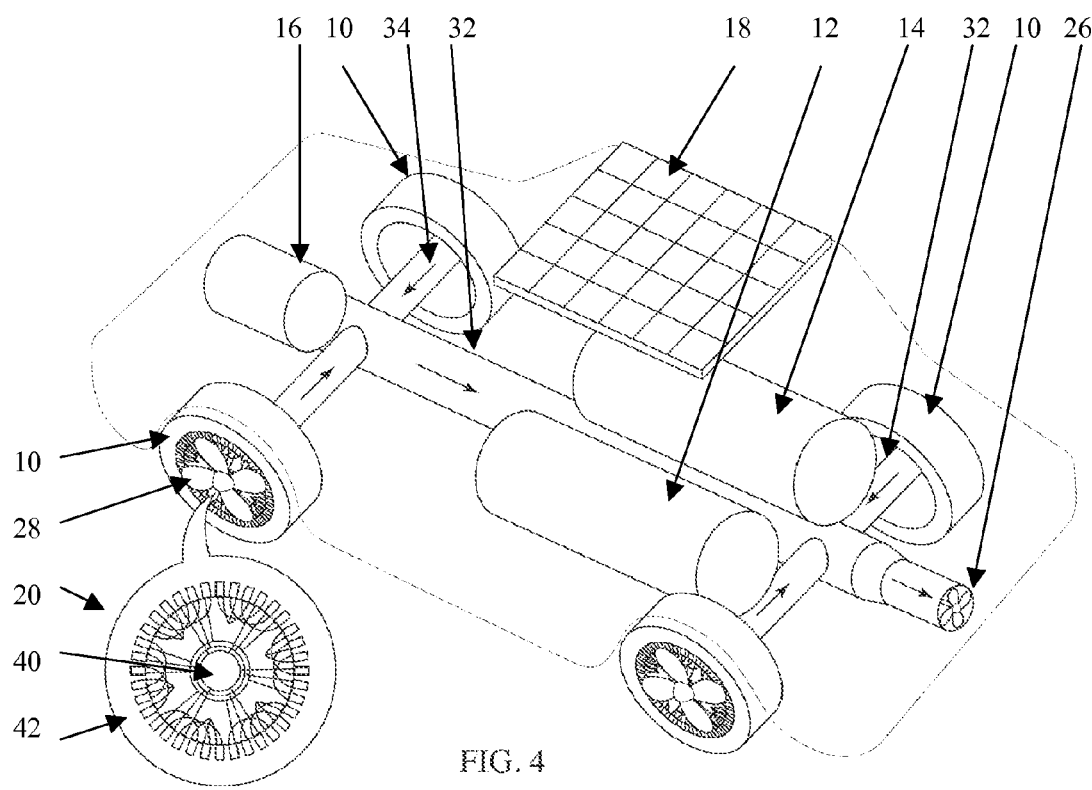
FIG. 4 is an isometric schematic diagram of a motor vehicle showing its drive system and an energy recovery system in accordance with the invention (including energy recovery of motor vehicle kinetic energy, wind flow energy, and solar radiation energy) and depicting an enlargement of a motor vehicle wheel equipped with a rotor and stator for effecting energy recovery and electric retarder capability.

Turning to FIG. 4, the energy recovery systems are indicated. The kinetic energy recovery system includes induction means 20, which recovers kinetic energy from tire rotation when motor vehicle brakes are not be actuated. When the brakes are actuated, however, then the induction means 20 provides electromagnetic retarder "frictionless braking". In a sense, the actuation of the brakes acts as a switch means alternate between modes of operation depending upon whether or not the brakes are actuated.

The induction means 20 includes a stator 40 and a rotor 42. The stator 40 remains stationary while the rotor 42 rotates with rotation of the wheel. In a conventional manner, the stator 40 and rotor 42 are wired to create electromagnetic induction. Unlike regenerative braking that generates electricity as friction brakes are applied, the kinetic energy recovery system operates to recovery energy from wheel rotation as the wheels rotate unencumbered by braking and a generator converts the recovered energy through induction into electricity.

The wind energy recovery system includes the turbine generator 26, wheel fans 28 and an air duct 30. The air duct 30 includes a main duct 32 that may be placed in the space otherwise reserved for a drive shaft extending between the front and rear wheel shafts since the drive shaft of conventional motor vehicles is no longer needed.

Air duct branches 34 from each of the wheels communicate with the main duct 32. Each of the wheel fans 28 have blades that rotate in unison with rotation of the vehicle wheel 10 to suck air through associated air duct branches 34 to reach the main duct 32. Such blades may constitute spokes of the wheel and thus integrated with the wheel. At the rear of the main duct 32 is the turbine generator 26 to which the airflow from the wheel fans eventually reach.

The roof mounted solar panel electricity generator 18 is conventional, but serves to generate electricity from insolation, i.e., from solar radiation.

The induction means 20 can be expected to generate heat during normal operation. If left unchecked, the generated heat may degrade performance of the induction means 20. To counter such degradation, the induction means 20 may be either air cooled or liquid fluid cooled or both.

Figure 5:
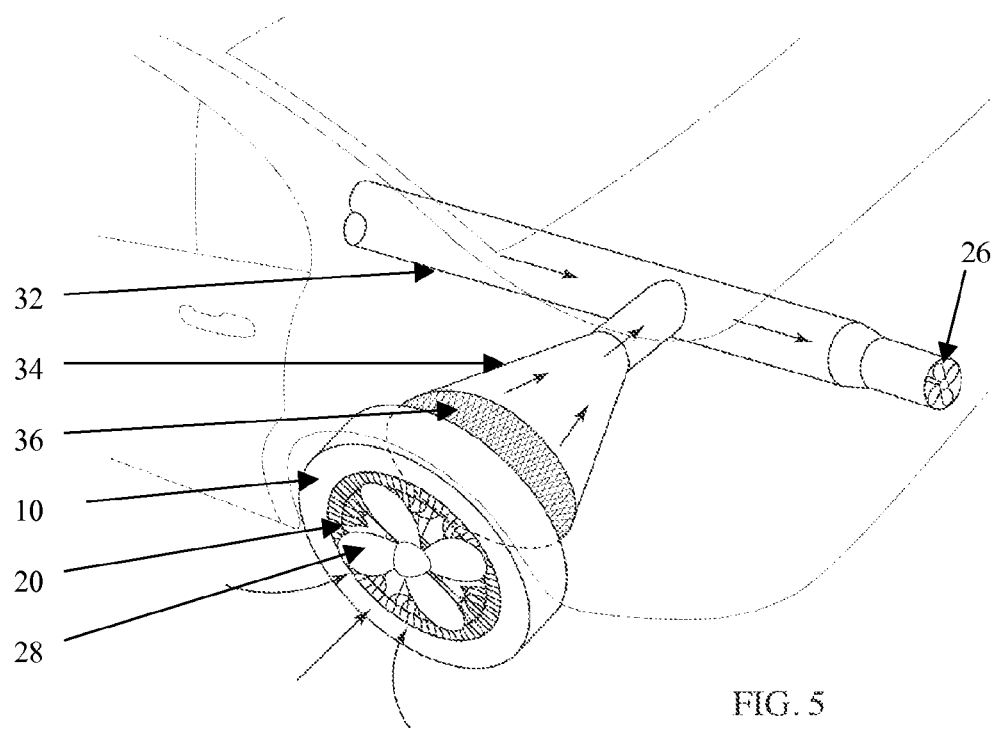
FIG. 5 is an isometric schematic diagram of a portion of the motor vehicle with respect to a rear wheel and wind flow system in accordance with the invention.

Turning to FIG. 5, the wheel fan 28 is located centrally within the wheel. The induction means 20 of the stator and rotator is in each wheel and may be air cooled from air flow passing through the wheel. For instance, a wheel fan 28 may be provided that sucks in air during tire rotation as indicated by the flow arrows. This suction forces the air through a mesh screen 36 to enter an air duct branch 34 through which the air is urged to reach the main duct 32 where the air combines with air sucked in through other wheels to turn blades of the turbine generator 26, which generates electricity. The mesh screen 36 prevents debris from the roadway, such as rocks, stones, snow, etc. from entering and thereby clogging the air duct branch 34 or the main duct 32. Drains may be provided to allow any accumulation of water to drain out of the ducts.

Each of the air duct branches 34 may be shaped to converge to the main duct 32 to that the sucked-in air flow from the wheel fans 28 pressurizes further during passage through the converging shape of an associated one of the air duct branches 34 to reach the main duct 32. The main duct 32 may likewise converge in a direction toward the turbine generator 26.

Figure 6:
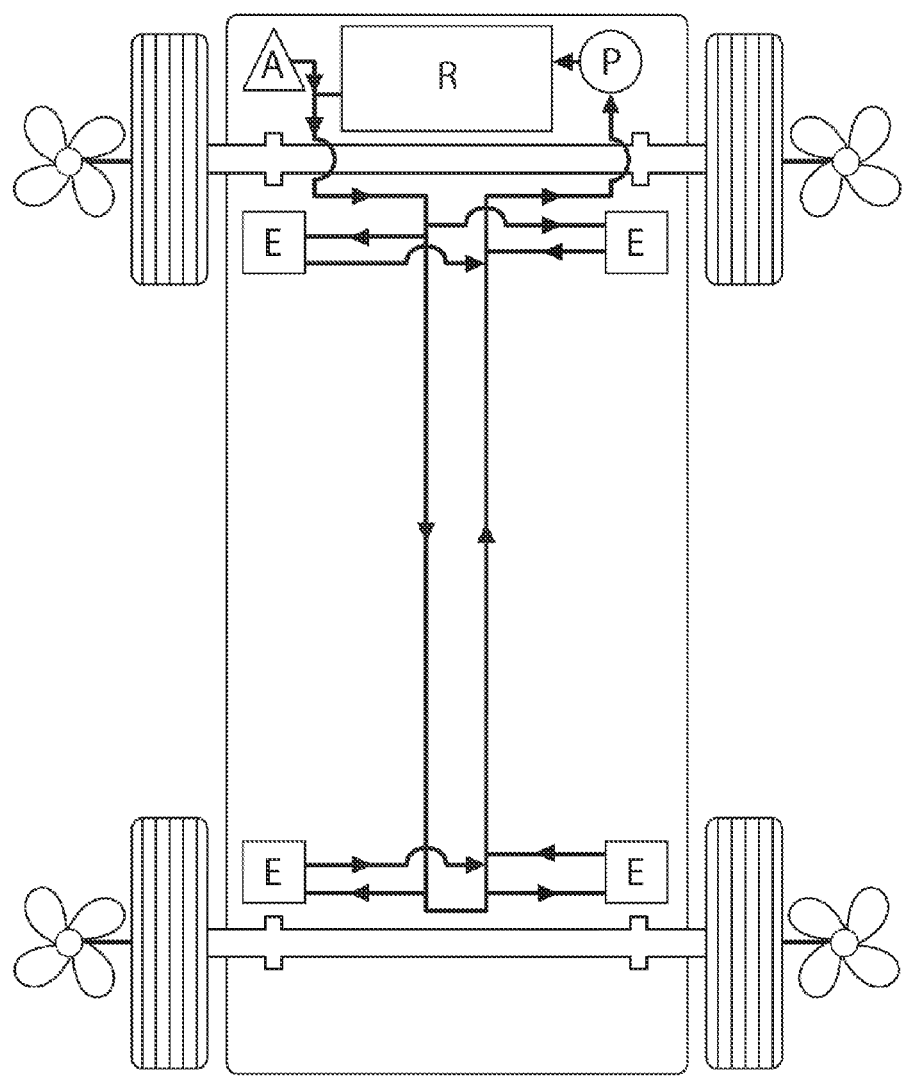
FIG. 6 is a schematic diagram of a motor vehicle equipped with anti-freeze cooling heat exchangers at each wheel to remove heat from inductors and carry the heat away to a front grille radiator to be cooled by air cooling.

Turning to FIG. 6, heat generated by the induction means 20 may be carried away via heat exchangers containing liquid coolant, such as anti-freeze or oil. A fluid delivery system is provided that includes a pump P, a fluid supply header and a fluid return header with two associated branch lines that extend to each of the heat exchangers E separately to fluid connect with the fluid supply and return headers. The pump P sucks in fluid from the return header into a radiator R where air cooling takes place to emerge into a fluid supply header to distribute the fluid coolant to each of the heat exchangers E. A coolant reservoir A whose contents is either anti-freeze or oil as the case may be feeds in the coolant to the supply header.

One of the obstacles to the use of eddy current braking in motor vehicles instead of friction braking concerns the use of brakes during parking maneuvers. The present invention overcomes this obstacle by supplementing the eddy current braking with another form of braking, such as friction braking as back-up. The rate of speed of the vehicle may be monitored by a controller to govern whether regenerative braking (or emergency friction braking) should be used or whether eddy current braking should be used. At relatively high speeds, eddy current braking should be used to the exclusion of friction braking so as to avoid wear of the friction braking, except if there is a failure with the eddy current braking.

Thus, the status of eddy current braking needs to be monitored as well by a controller, which would send signals quickly to initiate friction braking (whether regenerative or emergency friction braking) if sensors detect a failure with the eddy current braking. At slow speeds, the friction braking would be active. Thus, a controller is provided that receives sensor inputs from sensors monitoring the vehicle movement and from the eddy current braking to determine its effectiveness in slowing the motor vehicle so as to direct the activation of friction braking if warranted. Further, sensors may detect the proximity of vehicles in front (or fixed obstacles) to calculate whether eddy current braking alone will suffice to stop the vehicle in time or whether additional braking from friction braking should be applied as well and to send instructions accordingly to initiate the friction braking (whether regenerative or emergency friction braking) if warranted.

Whether or not the induction in the wheel is used for inducing electrical current or creating eddy currents is dependent upon the brake pedal position. The brake pedal is movable from a rest position to an actuated position. In the actuated position, significant braking should occur. In the rest position, little or no braking should occur. The concept is that as the wheel rotates, current is induced to boost the energy of the vehicle power supply. To slow the vehicle, electrical current from the power supply is passed to the inductors to create eddy currents that create resistance to continued rotation of the wheel. Eddy currents also generate heat, which is why airflow through the wheel is used to remove such heat by channeling the airflow away from the wheel, such as to a wind turbine generator where the airflow can be used to generate electricity.

In effect, the present invention is directed to a self rechargeable synergy drive apparatus of a motor vehicle equipped with a power supply and a plurality of wheels. There are conductive elements within confines of at least one wheel (i.e., within a rotor) and inductor circuit (within a stator) that generate a magnetic field in proximity of the conductive elements during the rotation of the at least one wheel. Also, there is a motor/generator circuit for passing electrical current from the power supply to inductor circuit and for passing induced electrical current from the inductor circuit to said power supply as an energy boost.

The motor vehicle is equipped with a throttle pedal for moving in and out of a throttle position. To give the driver of the motor vehicle flexibility in choosing between all wheel drive (e.g., four-wheel drive) and less than all wheel drive (e.g., two-wheel drive) depending upon terrain and weather condition, a setting switch is provided in the motor vehicle to allow the driver to choose between all wheel drive mode and less than all wheel drive mode.

In the case of all wheel drive mode, when the throttle pedal is pushed, a signal is sent to a controller that will send battery current through an inverter/converter to the motor/generator circuit causing the vehicle to move. The harder the pedal is pushed, the more current flows under direction of a variable resistance controller and the faster the vehicle goes. Depending upon load, battery state-of-charge and the design of the hybrid drivetrain, a heavy throttle will also activate the internal combustion engine (ICE) for more power. Conversely, lifting slightly on the throttle will decrease current flow to the motor and the vehicle will slow down. Lifting further or completely off the throttle will cause the current to switch direction—moving the motor/generator from motor mode to generator mode—and begin the regenerative braking process.

That is, the controller means being responsive to being set for all wheel drive mode to be both responsive to the throttle pedal moving into the throttle position to send the passing electrical current from the power supply to the motor/generator circuit for moving the motor vehicle and responsive to the throttle pedal moving out of the throttle position to send the induced electrical current from the motor/generator circuit to the power supply as the energy boost.

In the case of less than all wheel drive mode, there is no need for the motor/generator circuit to cause the vehicle to move. Thus, the controller may be responsive to being set for less than all wheel drive mode to pass induced electrical current to the power supply even as the throttle pedal means moves into the throttle position. That is, using the motor/generator circuit to provide motor functions is not feasible when less than all wheel drive mode has been set.

Regardless of whether all wheel drive mode or less then all wheel drive mode is set, the controller is responsive to a brake pedal moving into a brake position to send electrical current from the power supply to the induction means to create eddy currents to resist continued rotation of the at least one wheel and to generate heat. The controller is responsive to the brake pedal moving out of the braking position to cease sending the electrical current to the induction means and thereby cease creation of the eddy currents. The circuitry for carrying out eddy current braking may include a switch that actuates to enable bypassing the motor/generator circuit entirely since neither of the functions for imparting a motive force by a motor or generating electricity is needed to carry out eddy current braking. Thus, the appropriate electrical current from the power supply can be sent directly to the induction circuitry to create the eddy currents as the wheel with the conductive element continues to rotate.

In addition, fan blades are provided that are rotatable in unison with rotation of the wheel to create airflow that passes through the at least one wheel and takes away the heat generated by the eddy currents.

Further brakes may be provided either for the same wheel that employs the eddy braking and/or for other wheels of the same motor vehicle or both. These further brakes may be friction brakes, regenerative brakes, air brakes or hydraulic brakes. Ideally, sensors are provided to sense the vehicle speed. The sensed vehicle speed is sent as a signal to the controller, which assesses the effectiveness of the eddy current brakes in slowing the vehicle to determine the timing as to whether the further brakes are to be engaged to slow or stop the motor vehicle. The assessment is based at least in part on the sensed vehicle speed as it changes over time (albeit fractions of a second).

The person driving the motor vehicle can be given the choice of applying just the eddy current brakes or also the friction brakes by configuring the brake pedal to include sensors that trigger actuation of the eddy current brakes and the friction brakes at different inclinations of the brake pedal. For instance, if the person driving the motor vehicle lightly taps the brake pedal with the person's foot so that the brake pedal displaces from its original orientation by no more than some fixed percentage of travel distance that is less than half the full travel distance that the brake pedal may be displaced by the person's foot from the rest position to a flooring position, then only the eddy current brakes actuate.

If the person driving the motor vehicle passes that threshold distance by pressing the brake pedal further than the fixed percentage of travel that the brake pedal is capable of, then the friction brakes are actuated as well. The fixed percentage of travel of the brake pedal from a rest position that triggers eddy current braking, but not friction braking, may be, for example, any distance of travel of the brake pedal from its rest position to say 30 percent or 45 percent. Any further displacement of the brake pedal beyond the fixed percentage of travel triggers the friction brakes. The brake pedals may be equipped with sensors that emit signals either as the brake pedal displaces under foot pressure or as the brake pedal initially displaces under foot pressure to trigger eddy braking and as the brake pedal passes the fixed percentage of travel distance to trigger friction braking. Such signals are received by a controller, which directs the timing of commencement of the eddy current braking and of the friction braking.

The contents of U.S. Pat. No. 8,364,362 is incorporated herein by reference. Pertinent portions are essentially repeated here for easy reference, but language regarding eddy current braking and friction braking are added. If the motor vehicle is equipped with regenerative braking, then the regenerative braking may be actuated as is the case for friction braking as discussed in the following.

As is well known by persons skilled in the art, a drivetrain in a vehicle having an automated manual transmission includes an engine, a gearbox, and at least one drive-shaft connected to propel the vehicle. The gearbox includes a number of gears giving various gear ratios; a clutch is arranged between the engine and the gearbox to give the possibility to engage and disengage the connection between the gearbox and the engine.

Figure 7:
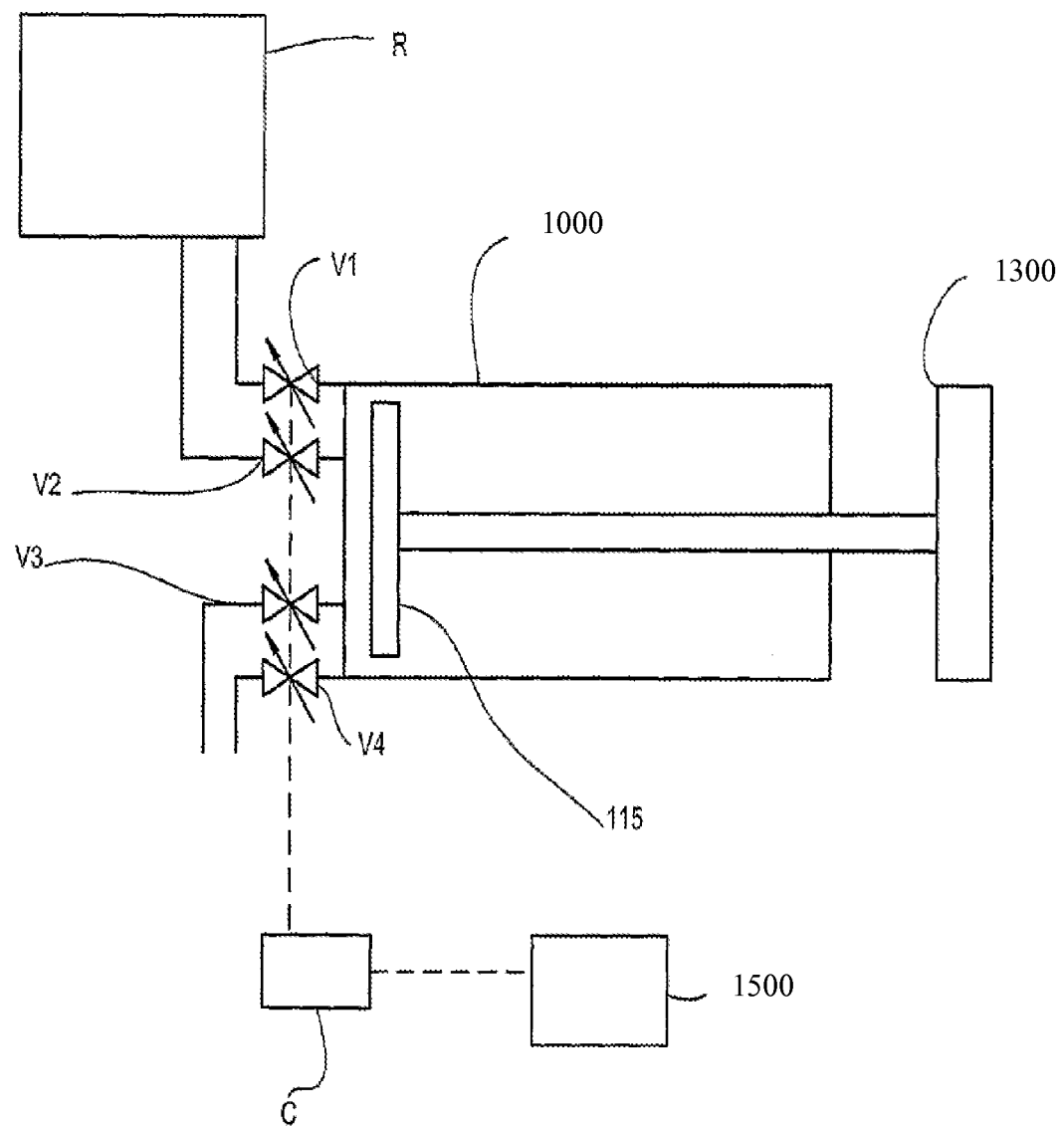
FIG. 7 is a schematic diagram of a conventional clutch assembly whose clutch may be disengaged by comparing brake pedal positions in accordance with U.S. Pat. No. 8,364,362.

With reference to FIG. 7, a clutch 1300 in a heavy duty vehicle, preferably a truck or a bus, is controlled by maneuvering a piston 115, which is connected thereto and reciprocally mounted in a clutch cylinder 1000, by opening or closing air supply valves V1 and V2, wherein the air supply valve V1 is a small diameter valve and air supply valve V2 is a large diameter valve. The air supply valves V1 and V2 are adapted to open and close a connection between an air supply R and the clutch cylinder 1000.

Upon pressurization, the piston 115 will be forced to the right in FIG. 7, due to air pressure acting on the left side of the piston 115. The piston motion to the right will disengage the clutch 1300, i.e. disengage the connection between an engine (not shown) and a gearbox (not shown), which in turn is connected to drive wheels (not shown) arranged to propel the vehicle.

The clutch 1300 is in its spring-biased rest position when the clutch is engaged, i.e. the clutch 1300 biases the piston 1100 to the left in FIG. 7. Hence, the clutch 1300 will be engaged upon pressure release of the cylinder space to the left of the piston 115. In order to release pressure from this space, two venting valves V3 and V4, wherein V3 is a small diameter valve and V4 is a large diameter valve, are arranged to vent pressure in the cylinder 1000 to the atmosphere.

The valves V1-V4 are controlled by an electronic controller C. The controller can order a fast clutch disengagement by ordering an opening of both the air supply valves V1 and V2 simultaneously, a somewhat slower clutch disengagement by ordering opening of only the large diameter valve V2, and an even slower clutch disengagement by ordering opening of only the small diameter valve V1. An even slower clutch disengagement can be achieved by pulse width modulation or frequency modulation of the opening of the valve V1 or V2.

In a similar manner, clutch engagement can be controlled by selectively opening the valves V3 and V4.

Figure 8:
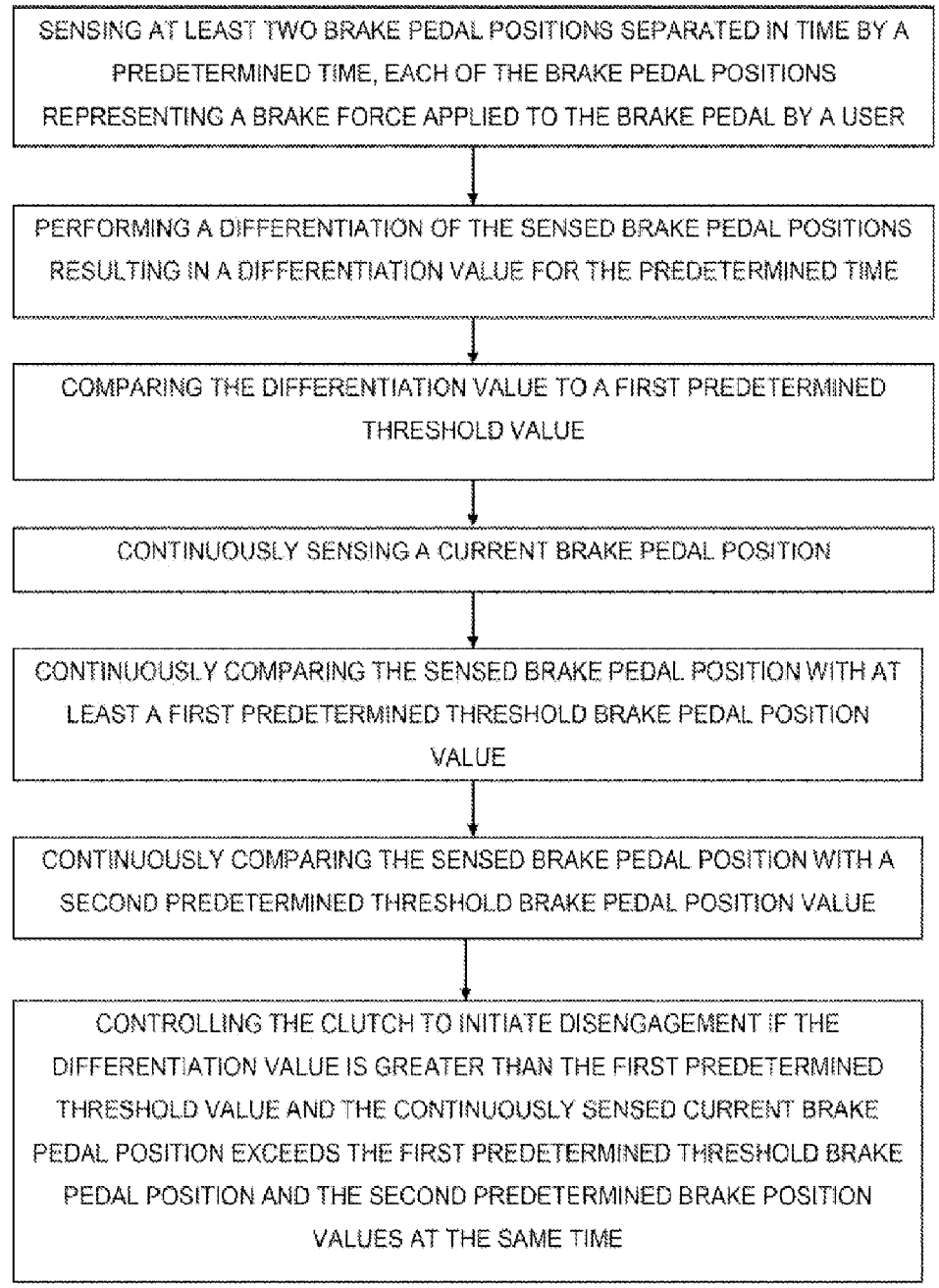
FIG. 8 is a flow chart of a conventional method for clutch disengagement by comparing brake pedal positions in accordance with U.S. Pat. No. 8,364,362.

According to an aspect of the invention illustrated by a flow chart shown in FIG. 8, the clutch disengagement could be controlled responsive to a signal from a sensor 1500, which is arranged to sense a brake pedal position. The signal could preferably be transferred to the controller or any other signal processing means (not shown). Likewise, eddy current brake engagement and friction brake engagement may be controlled responsive to the same signal from the sensor 1500.

If the signal is transferred to the controller C, the controller C preferably contains hardware or software to perform a signal processing of the signal from the brake pedal sensor 1500, e.g. as follows.

First, the controller performs a differentiation of the signal from the brake pedal sensor as a function of time. The differentiation could be performed in a number of ways; in the most simplified variant, the controller uses the signal from the brake pedal sensor a certain time (e.g. 0, 1 s) after initial brake pedal maneuvering as the differentiation value. Should the differentiation value exceed e.g. 10% of maximum applicable brake force, the controller will control the valves V1 and V2 to open, hence achieving a fast clutch disengagement. The reasoning behind this clutch disengagement is that the controller regards a rapid brake initiation, i.e. a high differentiation value, as a first step towards a fast braking, which benefits from a rapid, and early, clutch disengagement. Likewise, both eddy current braking and friction braking are actuated on the basis that rapid brake initiation is desired.

If the differentiation value is lower than the e.g. 15% of maximum brake force, there are (at least) three different options for the controller controlling the clutch. Likewise, control of eddy current braking and friction braking is effected in an analogous manner.

In a first case, wherein the signal from the brake pedal sensor represents a light brake application, e.g. below 5% of maximum applicable brake force, the controller will control the clutch and the gearbox almost the same way it does when the signal from the brake pedal sensor represents no brake application, i.e. disengage the clutch when the engine has reached idling speed, gear down the gearbox, and reengage the clutch until the engine has reached idling speed, when it again will disengage the clutch for a new gear-down of the gearbox, and so on until the gearbox has reached a gear that represents two gearshifts above a starting gear, i.e. the gear used for vehicle take-off (which will vary depending on vehicle load). When the gearbox has reached the gear two numbers above the take-off gear, the controller will disengage the clutch if any brake is applied. If no brake is applied, the controller will allow the vehicle to continue to run on engine idling speed at the gear two numbers above take-off gear. As mentioned earlier, clutch engagement with various rates could be achieved by opening the valves V3 and V4. Further, only eddy current braking is actuated for this first case.

In a second case, the signal from the brake pedal sensor 1500 represents a "medium" braking, e.g. 5-30% of maximum braking load. Here, the controller will control the clutch to be engaged until the engine has reached idling speed. Thereafter, the controller controls the clutch to disengage, and stay disengaged until the signal from the brake pedal sensor 1500 signals that the brake pedal has been at least partly released, e.g. to a force value according to the first case, or until the vehicle has stopped and the gearbox has been put in a neutral position. Likewise, only eddy current braking is actuated for this "medium" braking scenario.

In a third case, the brake pedal position represents that a heavy braking action is required, e.g. more than 30% of maximum braking. In this case, the controller will control the clutch to be disengaged, e.g. by opening both or either of the valves V1 and/or V2. In this third case, either both eddy current braking and friction braking are actuated.

In the first and second cases, i.e. the cases representing brake application from 0-30% of maximum applicable braking force, the clutch disengagement rate could be adapted to give smoothest possible disengagement, e.g. by controlling opening of only one of the valves V1 or V2, which, as mentioned, gives a slower clutch disengagement than opening both valves V1 and V2 simultaneously.

As can be understood, the above described embodiments are only exemplary, many diversions could be made of the described embodiments without departing form the scope of the invention. For example, the differentiation value of the brake position could be calculated continuously, e.g. by streaming a flow of brake pedal position signals to the controller C, wherein each brake pedal position signal is accompanied with a time at which the actual measurement was made. By comparing two neighboring brake pedal positions, and divide the difference between the brake pedal positions by the time between the measurements, a value regarding rate of brake application could be obtained.

Figure 9:
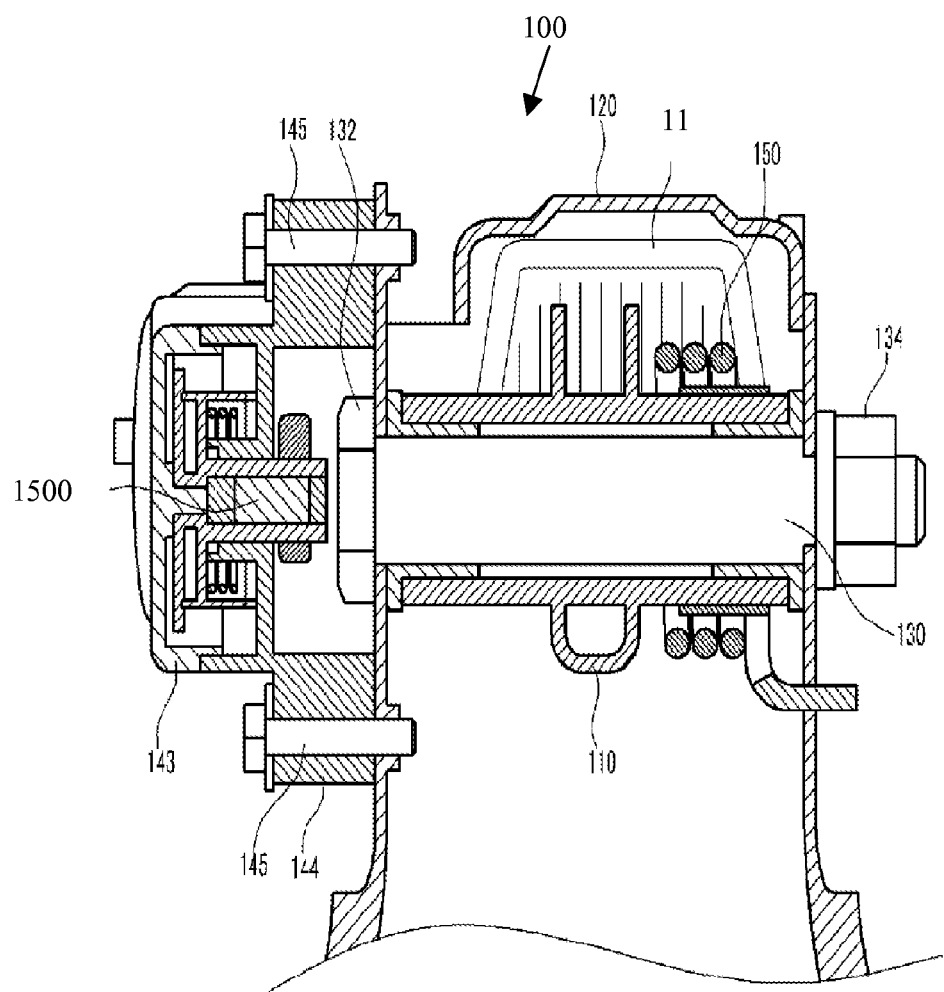
FIG. 9 is a cross-sectional view of a brake pedal stroke sensor in accordance with U.S. Pat. No. 8,240,196.
Figure 10:
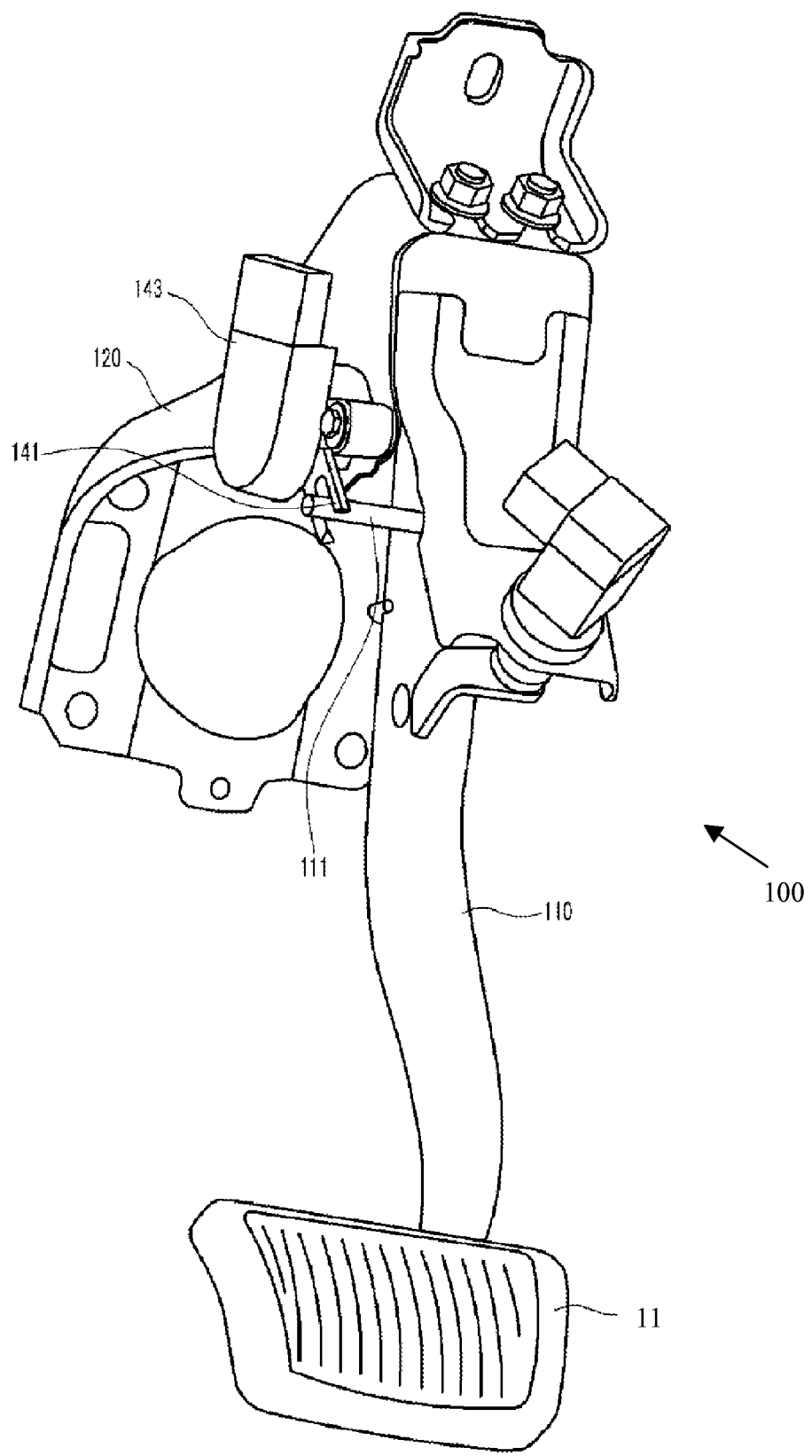
FIG. 10 is an isometric view of the brake pedal stroke sensor of FIG. 9 in accordance with U.S. Pat. No. 8,240,196.

The structure and operation of brake pedal stroke angle sensors are conventional, such as that disclosed in U.S. Pat. No. 8,240,196, whose contents are incorporated herein by reference. Turning to FIGS. 9 and 10, which essentially correspond to FIGS. 1 and 2 of U.S. Pat. No. 8,240,196, the brake angle sensor 1500 detects a depressing force of the pedal arm of the brake pedal, and the resulting value is calculated based on a change of time so as to determine whether it is suddenly stopped or not. At this time, a brake assist device can be provided to increase braking performance at a time of a sudden stop. In the present application, regenerative or friction braking may be considered a type of "brake assist device" that assists the eddy current braking of the present invention if such assist is needed.

As shown in FIGS. 9 and 10, the brake pedal stroke sensor 100 includes a pedal arm 110 with the brake pedal 11 assembled at one frontal end thereof, a hinge shaft 130 that is fixed to a frame 120 and rotatably supports the pedal arm 110 such that the pedal arm 110 can be rotated with respect to the hinge shaft 130, a sensor lever 141 that is engaged with a drive pin 111 of the pedal arm 110 and that is formed with an elongated slot, and the brake angle sensor 1500 for detecting a rotary angle of the pedal arm 110.

The pedal arm 110 operates a brake (not shown) according to a depressing force of the brake pedal 11.

A drive pin 111 is integrally rotated according to rotation of the pedal arm 110 and at the same time is slid along the elongated slot 142, and a rotary angle is transmitted to the sensor lever 141 through the drive pin 111.

The brake angle sensor 1500 detects the angle through the sensor lever 141 and can be a conventional variable resistor. The brake angle sensor 1500 is mounted in a bracket 144 assembled at the frame 120, and a sensor cover 143 is provided at the opposite side thereof, that is, the brake angle sensor 1500 is mounted inside the sensor cover 143 and supported by the bracket 144.

Further, the bracket 144 is mounted at the frame 120 through a mounting bolt 145, and the brake angle sensor 1500 is mounted in the bracket 144. The sensor cover 143 covers the bracket 144. Therefore, the hinge head 132 is mounted at the inside of the sensor cover 143 and the bracket 144.

When a driver depresses the brake pedal 10, the pedal arm 110 is rotated with respect to the hinge shaft 130. At this time, the drive pin 111 is integrally rotated with the pedal arm 110. Because the drive pin 111 is inserted inside the elongated slot 142 of the sensor lever 141 with a tight tolerance, it is rotated and slid along the elongated slot 142.

The brake angle sensor 1500 then detects a change of an angle thereof due to rotation of the sensor lever 141.

In addition, the brake angle sensor 1500 detects an angle thereof through a change of an output voltage and then calculates a rotary angle, so the brake angle sensor 1500 is required for determining the output voltage as a predetermined value at a position of an early stage of movement of the sensor lever.

While the foregoing description and drawings represent the preferred embodiments of the present invention, it will be understood that various changes and modifications may be made without departing from the scope of the present invention.

What is claimed is:

1. A self rechargeable synergy drive apparatus of a motor vehicle equipped with a power supply and a plurality of wheels, comprising:
   conductive elements within confines of at least one wheel;
   induction means for generating a magnetic field in proximity of the conductive elements during the rotation of the at least one wheel;
   a motor/generator circuit means for passing electrical current from the power supply to the induction means and for passing induced electrical current from the induction means to said power supply as an energy boost;
   throttle pedal means for moving into and out of a throttle position that speeds rotation of the wheels of the motor vehicle;
   brake pedal means for moving in and out of a braking position that slows or stops the wheels of the motor vehicle under certain traveling speed conditions;
   eddy current braking means responsive to said brake pedal moving into the brake position to send electrical current from the power supply to the induction means to create eddy currents to resist continued rotation of the at least one wheel and to generate heat and for ceasing to send the electrical current to the induction means and thereby cease creation of the eddy currents in response to release of said brake pedal means from the braking position, said motor/generator circuit means passing induced electrical current from the induction means to said power supply as the energy boost independent of the throttle pedal means moving in and out of the throttle position so as to allow the passing of the induced electrical current from the induction means to said power supply even as the throttle pedal means remains in the throttle position; and fan blades rotatable in unison with rotation of the wheel to create airflow that passes through the at least one wheel and takes away the heat generated by the eddy currents.

2. The apparatus of claim 1, further comprising:

a frame with an axle that supports the at least one wheel to enable rotation, the frame supporting a further axle that supports a further wheel to enable rotation, the further wheel being equipped with a brake responsive to said brake pedal means being in the braking position to brake the further wheel and responsive to the brake pedal means being out of the braking position to permit continued rotation of the further wheel.

3. The apparatus of claim 2, wherein the brake is selected from a group consisting of a friction brake, a regenerative brake, an air brake and a hydraulic brake.

4. The apparatus of claim 2, further comprising:

sensors that sense vehicle speed; and a controller that assesses effectiveness of the eddy currents in resisting the continuation of the rotation of the at least one wheel based at least in part on the sensed vehicle speed, the controller initiating actuation of a further brake to brake the vehicle if warranted based on the assessed effectiveness of the eddy current in resisting the continuation of the rotation of the at least one wheel.

5. The apparatus of claim 4, wherein the further brake is selected from a group consisting of a friction brake, a regenerative brake, an air brake and a hydraulic brake.

6. The apparatus of claim 1, further comprising:

means for recovering wind energy from the airflow passing through the at least one wheel and converting the recovered wind energy into electricity.

7. The apparatus of claim 1, further comprising:

means for providing a synergy energy boost to the power supply via a vehicle roof mounted means for converting insolation into electricity to charge the power supply.

8. The apparatus of claim 1, further comprising:

means for providing a synergy energy boost to the power supply via a wind turbine generator that converts energy from the airflow through the at least one wheel into electricity; and channeling means that extends between the at least one wheel and the wind turbine generator means for channeling the airflow from the at least one wheel to the wind turbine generator.

9. The apparatus of claim 1, wherein the at least one wheel is equipped with a further brake responsive to said brake pedal means being in the braking position to brake the at least one wheel and responsive to the brake pedal means being out of the braking position to permit continued rotation of the at least one wheel.

10. The apparatus of claim 9, wherein the further brake is selected from a group consisting of a friction brake, a regenerative brake, an air brake and a hydraulic brake.

11. The apparatus of claim 1, further comprising sensors, the sensors sensing vehicle speed and the controller assessing effectiveness of the eddy currents in resisting the continuation of the rotation of the at least one wheel based at least in part on the sensed vehicle speed, the controller initiating actuation of a further brake to brake the vehicle if warranted based on the assessed effectiveness of the eddy current in resisting the continuation of the rotation of the at least one wheel.

12. The apparatus of claim 1, further comprising a controller that activates and deactivates said eddy current braking means; and setting means for selectively setting the controller for less than all wheel drive mode and for all wheel drive mode, said controller being responsive to being set for less than all wheel drive mode to pass induced electrical current to the power supply even as the throttle pedal means moves in the throttle position, said controller being responsive to being set for all wheel drive mode to be both responsive to said throttle pedal means moving into the throttle position to send the passing electrical current from the power supply to the motor/generator circuit means to move the motor vehicle and responsive to said throttle pedal moving out of the throttle position to send the induced electrical current from the motor/generator circuit means to the power supply.

13. The apparatus of claim 1, wherein the brake pedal means is movable from a rest position through a plurality of actuation positions; said eddy current braking means being responsive to movement of the brake pedal means out of the rest position and into at least one of the plurality of relative actuation positions to actuate eddy current braking; sensing means for sensing the brake pedal means reaching different ones of the plurality of actuation positions; means responsive to said sensing means for actuating an assist to the eddy current braking as the brake pedal means reaches the different ones of the plurality of actuation positions beyond those for triggering actuation of just the eddy current braking, said assist being selected from the group consisting of air braking, friction braking, regenerative braking and hydraulic braking.

14. The apparatus of claim 1, further comprising:

at least one heat exchanger neighboring the induction means; and means for channeling a liquid coolant to the at least one heat exchanger that heat exchanges with the induction means at the at least one heat exchanger to take in heat from the induction means.

15. The apparatus of claim 14, wherein the liquid coolant is selected from the group consisting of antifreeze and oil.

16. The apparatus of claim 14, wherein the means for channeling channels the heated liquid coolant to a radiator that is air cooled.

* * * * *